(12) United States Patent
Kuffner et al.

(10) Patent No.: US 8,699,360 B2
(45) Date of Patent: Apr. 15, 2014

(54) COMMUNICATIONS SYSTEM FOR EXCHANGING SPECTRUM SENSING MEASUREMENTS THROUGH A DROP BOX AND METHOD OF USING SAME

(75) Inventors: Stephen L. Kuffner, Algonquin, IL (US); Ramy S. Ayoub, Arlington Heights, IL (US); John M. Belcea, W. Melbourne, FL (US); Gregory J. Buchwald, Crystal Lake, IL (US); Lynn D. Dann, Sleepy Hollow, IL (US); Mario F. Derango, Cary, IL (US); Lawrence M. Ecklund, Wheaton, IL (US); Randy L. Ekl, Lake Zurich, IL (US); Michael S. Johnson, Orlando, FL (US); S. David Silk, Barrington, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 224 days.

(21) Appl. No.: 12/059,851

(22) Filed: Mar. 31, 2008

(65) Prior Publication Data

US 2009/0245119 A1    Oct. 1, 2009

(51) Int. Cl.
*H04L 12/28* (2006.01)
*H04L 12/66* (2006.01)
*H04B 7/216* (2006.01)

(52) U.S. Cl.
USPC .......................... 370/252; 370/342; 370/352

(58) Field of Classification Search
USPC .......................................... 370/252, 352, 342
See application file for complete search history.

(56) References Cited

U.S. PATENT DOCUMENTS

| 5,497,503 | A | | 3/1996 | Rydberg et al. |
| 5,677,909 | A | * | 10/1997 | Heide ........................... 370/347 |
| 5,940,768 | A | | 8/1999 | Thro et al. |
| 6,377,567 | B1 | * | 4/2002 | Leonard ........................ 370/352 |
| 6,442,387 | B1 | | 8/2002 | Silventoinen et al. |
| 6,519,568 | B1 | * | 2/2003 | Harvey et al. ..................... 705/1 |
| 6,996,374 | B1 | | 2/2006 | Bao |
| 7,127,212 | B2 | | 10/2006 | Fattouch |
| 7,366,519 | B2 | | 4/2008 | Jason |
| 2005/0159109 | A1 | * | 7/2005 | Kivekas et al. ............ 455/67.11 |
| 2006/0067354 | A1 | | 3/2006 | Waltho et al. |

(Continued)

FOREIGN PATENT DOCUMENTS

| WO | 0108322 A1 | 2/2001 |
| WO | 2009018300 A1 | 2/2009 |

OTHER PUBLICATIONS

E. Vistosky et al—"On Collaborative Detection of TV Transmissions in Support of Dynamic Spectrum Sharing"—Motorola Labs—IEEE 2005—pp. 338-345.

(Continued)

*Primary Examiner* — Mark Rinehart
*Assistant Examiner* — Angel Brockman
(74) *Attorney, Agent, or Firm* — Barbara R. Doutre (57) ABSTRACT

A communications system and method for exchanging spectrum usage information through a drop box (100) includes one or more central stations (101) that defines a region of operation. A central drop box (102) is associated with the central station (101) for providing a database of spectrum usage information. Stations (103, 105, 107) using the communications system may submit information regarding spectrum usage to the central drop box (102) that affects the region of operation (109, 115) for providing the most efficient and non-interfering uses of the frequency spectrum.

25 Claims, 8 Drawing Sheets

(56) References Cited

U.S. PATENT DOCUMENTS

| | | | |
|---|---|---|---|
| 2006/0084444 | A1 | 4/2006 | Kossi et al. |
| 2006/0135070 | A1 | 6/2006 | Karabinis |
| 2006/0227747 | A1 | 10/2006 | Kim et al. |
| 2006/0268738 | A1* | 11/2006 | Goerke et al. ............... 370/254 |
| 2007/0032254 | A1* | 2/2007 | Chen ............................ 455/509 |
| 2007/0091998 | A1* | 4/2007 | Woo et al. ................ 375/240.02 |
| 2007/0097904 | A1* | 5/2007 | Mukherjee et al. .......... 370/328 |
| 2008/0076450 | A1 | 3/2008 | Nanda et al. |
| 2008/0089306 | A1* | 4/2008 | Hu ................................ 370/342 |
| 2008/0171552 | A1* | 7/2008 | Hyon et al. ................... 455/450 |
| 2008/0216133 | A1 | 9/2008 | Vergoossen |
| 2008/0222020 | A1* | 9/2008 | Stanforth et al. ............... 705/37 |
| 2008/0222021 | A1* | 9/2008 | Stanforth et al. ............... 705/37 |
| 2008/0261639 | A1* | 10/2008 | Sun et al. ...................... 455/515 |
| 2008/0299918 | A1 | 12/2008 | Jallon |
| 2009/0003201 | A1 | 1/2009 | Horvitz |
| 2009/0011788 | A1 | 1/2009 | Shan et al. |
| 2009/0012738 | A1 | 1/2009 | Hart et al. |
| 2009/0111463 | A1* | 4/2009 | Simms et al. ................. 455/424 |
| 2009/0186632 | A1 | 7/2009 | Kennedy et al. |
| 2009/0191910 | A1 | 7/2009 | Athalye et al. |
| 2009/0215457 | A1* | 8/2009 | Wang et al. ................ 455/435.1 |
| 2009/0268619 | A1* | 10/2009 | Dain et al. .................... 370/252 |
| 2009/0270025 | A1 | 10/2009 | Kossi et al. |
| 2010/0041339 | A1 | 2/2010 | Miller, II |
| 2010/0046440 | A1 | 2/2010 | Singh |
| 2010/0075704 | A1 | 3/2010 | McHenry et al. |
| 2010/0098036 | A1 | 4/2010 | Li |
| 2010/0195590 | A1 | 8/2010 | Park |
| 2010/0255794 | A1 | 10/2010 | Agnew |
| 2010/0304678 | A1 | 12/2010 | Chandra et al. |
| 2010/0309317 | A1 | 12/2010 | Wu et al. |
| 2010/0330919 | A1 | 12/2010 | Gurney et al. |
| 2011/0170512 | A1 | 7/2011 | Ghosh et al. |
| 2011/0312368 | A1* | 12/2011 | Hamdi et al. ................. 455/522 |
| 2012/0135767 | A1 | 5/2012 | Singh |

OTHER PUBLICATIONS

Le Gruenwald et al—"A Power-Aware Technique to manage Real-Time Transactions in Mobile Ad-Hoc Networks"—IEEE 2001—pp. 570-574.

Mircea Grecu et al—"Detection of Anomalous Propagation Echoes in Weather Radar Data Using Neural Networks"—IEEE 1999—pp. 287-296.

Chang-Joo Kim et al—"WRAN PHY and MAC Proposal for TDD/FDD"—IEEE 802.22-05/018r0—Wireless RANs—Nov. 2005—42pp.

PCT/US2009/036892—EPC International Search Report mailed Jul. 1, 2009—15 pages.

Nolan K.E. et al—"Demonstration and Analyses of Collaboration, Coexistence, and Interoperability of Cognitive Radio Platforms"—Consumer Communications and Networking Conference, 2007, CCNC Jul. 20, 2007 4th IEEE—Jan. 2007—XP031087962—ilSBN 978-1-4244-0667-8—pp. 1149-1153.

Kevin Zhang et al—"Dynamic Spectrum Access Enabled DoD Netcentric Spectrum Management"—Military Communications Conference, 2007, MILCOM 2007, IEEE, Piscataway, NJ—Oct. 2007—XP031232459—ISBN 978-1-4244-1512-0—pp. 107.

Youping Zhao et al—Applying Radio Environment Maps to Cognitive Wireless Regional Area Networks—New Frontiers in Dynamic Spectrum Access Networks, 2007—2nd IEEE International Symposium—Apr. 2007—XP031095609—ISBN 978-1-4244-0663-0—pp. 115-118.

Jondral F.K.—Cognitive Radio—A Communications Engineering View—IEEE Wireless Communications, IEEE Service Center, vol. 14, No. 4—Aug. 2007—XP011191775—ISSN 1536-1284—pp. 28-33.

WiFi Alliance Mar. 19, 2009 FCC filing (04-186 Unlicensed Device Operation in the TV Bands proceeding.

International Search Report and Written Opinion for related International Patent Application No. PCT/US2010/039399 mailed on Feb. 10, 2012.

FCC ET Document No. 04-186, "Unlicensed Operation in the TV Broadcast Bands—Notice of Proposed Rule Making", May 25, 2004.

Non Final Office Action mailed on Jul. 2, 2012 in U.S. Appl. No. 12/493,886, David P. Gurney, filed Jun. 29, 2009.

Final Office Action mailed on Jan. 22, 2013 in related U.S. Appl. No. 12/493,886, David P Gurney, filed Jun. 29, 2009.

Non Final Office Action mailed on Jul. 8, 2013 in related U.S. Appl. No. 12/493,886, David P Gurney, filed Jun. 29, 2009.

Office Action for counterpart Canadian Patent Application No. 2719498 mailed on Oct. 15, 2012.

Office Action for counterpart Canadian Patent Application No. 2719498 mailed on May 27, 2013.

Kim, Chang-Joo et al—IEEE P802.22-05.0108r0—Wireless RANs—WRAN PHY and MAC Proposal for TDD/FDD—Dated Nov. 2005—43 pages.

* cited by examiner

COMMUNICATIONS SYSTEM FOR EXCHANGING SPECTRUM SENSING MEASUREMENTS THROUGH A DROP BOX AND METHOD OF USING SAME

FIELD OF THE INVENTION

The present invention relates generally to the efficient utilization of radio frequency (RF) spectrum and more particularly to a regional CR database for allowing heterogeneous cognitive radio networks to submit and share information regarding sensing observations.

BACKGROUND

Cognitive radio (CR) is a paradigm for wireless communication in which either a network or a wireless node changes its transmission or reception parameters to communicate efficiently while avoiding interfering with licensed users and coexisting with other unlicensed users. This alteration of parameters is based on the active monitoring of several factors in the external and internal radio environment, such as radio frequency spectrum, user behavior and network state. In a CR network, elements of the network may be assigned sensing tasks to maximize the network's responsiveness to the presence of one or more parameters, such as higher priority users, interference, or important changes to the operation of the air interface. Generally, the individual nodes draw conclusions about the spectral occupancy of multiple channels, frequencies, and networks and submit their conclusions to a coordinating node in one or more centralized network or with neighbors in a distributed network. This information is kept within each of the networks.

CR networks in proximity to one another could benefit from a sharing of observations, which would act to extend the effective sensing range and/or reliability of the individual nodes and networks. This would allow networks to better utilize resources and abandon a channel or other frequency spectrum due to the presence of a higher priority user or potential interference. Networks could also discover the extent of their emissions as measured by neighboring networks, thereby allowing them to compare their emissions with expectations and adjust transmit power accordingly.

The prior art describes various types of spectrum sensing systems and methods; however, these systems do not describe how to process this information. For example, the publication to Visotsky et al. entitled "On Collaborative Detection of TV Transmissions in Support of Dynamic Spectrum Sharing" describes combining signal-to-noise (SNR) data for soft combining of sensing, but does not measure parameters such as raw spectrum or time domain measurements that can afford a greater opportunity for extraction of signal information. The publication to Gruenwald entitled "A Power-Aware Technique to Manage Real-Time Database Transactions in Mobile AD-Hoc Networks" describes a repository of information and a reservation system as well as nodes reporting their location information and energy level such as in battery reserves. However, the Gruenwald publication does not describe a database being used to enhance or otherwise coordinate radio operations or make spectrum choices which could improve the capacity and reliability performance of the system. The publication to Grecu et al. entitled "Detection of Anomalous Propagation Echoes in Weather Radar Data using Neural Networks" proposes limiting the examination of a propagation anomaly to an originating node. However, much more information could be gathered by a network of sensing nodes to determine the propagation. Finally, the publication to Kim et al. entitled "WRAN PHP/MAC Proposal for TDD/FDD" describes the use of a separate scanning receiver but does not describe any encrypted transmission of sensing results for protection of the database.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a method for exchanging and processing spectrum sensing measurements through a drop box. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a method for exchanging and processing spectrum sensing measurements through a drop box as described herein. The non-processor circuits may include, but are not limited to, a radio receiver, a radio transmitter, signal drivers, clock circuits, power source circuits, and user input devices. As such, these functions may be interpreted as steps of a method to perform a method for exchanging and processing spectrum sensing measurements through a drop box. Alternatively, some or all functions could be implemented by a state machine that has no stored program instructions or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

Figure 1:
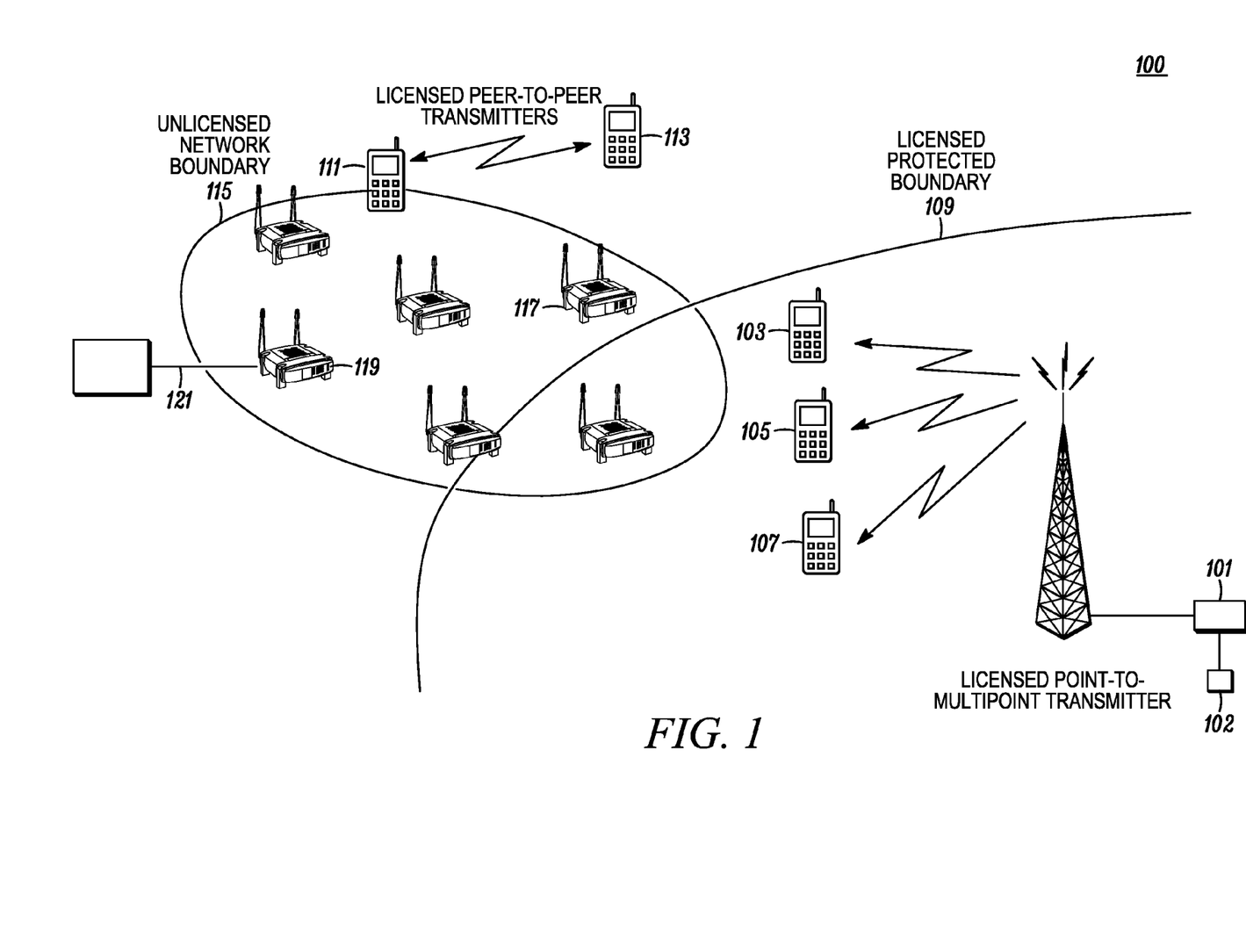
FIG. 1 is a block diagram illustrating a cognitive radio system used for exchanging spectrum sensing measurements though a drop box in accordance with an embodiment of the present invention.

The present invention is directed to a regional CR database or CR "Wiki" that allows heterogeneous CR networks to submit information regarding sensing observations as well as other information that could benefit heterogeneous networks. The CR environment 100 includes a central licensed station 101 working in a point-to-multipoint manner with a plurality of mobile stations 103, 105, 107. The central station 101 and mobile stations 103, 105, 107 operate within a region of operation such as licensed protected boundary 109. Similarly, licensed mobile stations 111, 113 operate in a peer-to-peer fashion at an arbitrary location which may overlap an unlicensed network boundary 115, which in turn may operate adjacent to or within the licensed protected boundary 109. As seen in FIG. 1, a portion of the unlicensed boundary 115 may extend or overlap into the licensed protected boundary.

In a preferred embodiment, the CR database is accessible over the Internet via wireless or wired connections. Cognitive radios 117 that do not have direct access to the Internet themselves may gain access through an unlicensed unit 119 which has an Internet connection 121. In some cases, if the cognitive radios can configure themselves with the appropriate licensed personality, they may access the Internet through licensed networks such as cellular, personal communication services (PCS), third generation cellular systems (3G), Worldwide Interoperability for Microwave Access (WiMAX) or other licensed networks. In operation a regional CR database may be centralized at a central station 101 or can be a distributed regional real-time database that serves as a repository for information from multiple CR networks within the range of influence of the database. The centralized database may include a superset of information in a wired network, distributed in a number of wireless nodes, or both where access of the database may be over either wired or wireless channels. Several types of information would be conducive to the efficient use of unused or underused spectrum, and several examples are given here. Even if the database were distributed to a number of wireless nodes, these stations or "nodes" could all contain more information than that particular node could use. For example, if a node can operate at VHF/UHF/700/800 cognitively, but cannot operate at 2.4, 4.9, and/or 5.8 GHz because it does not have a transceiver for those frequencies, it can still contain database information for some or all of those frequency bands, so that other nodes which come within range that can work at both lower frequencies and higher frequencies can retrieve the info.

Figure 2:
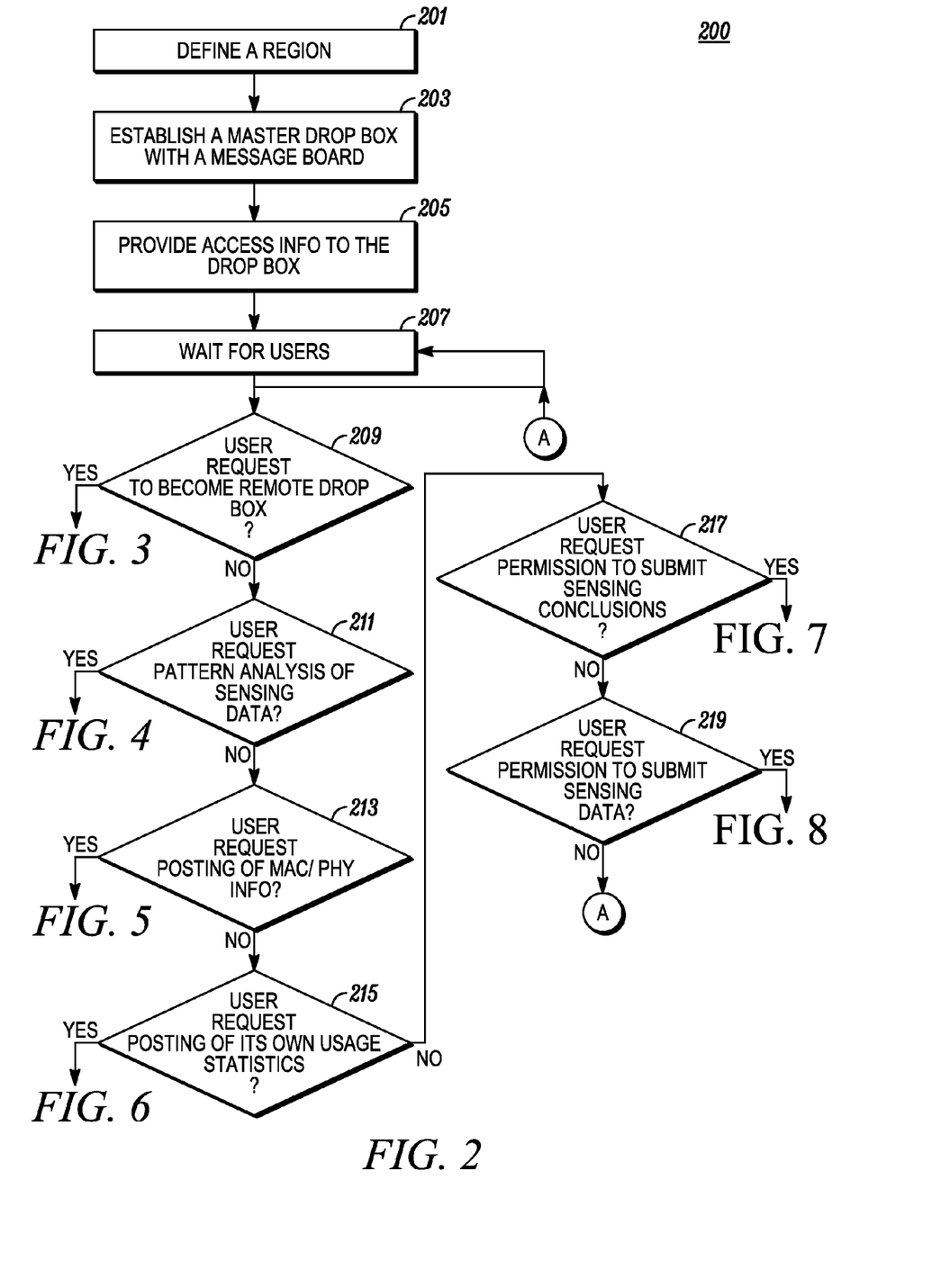
FIG. 2 is a flowchart diagram illustrating the steps for posting and exchanging information to a drop box.

FIG. 2 is a flowchart diagram illustrating the steps for posting and exchanging information to a drop box as shown in FIG. 1. Initially, a geographic region is defined 201 by specifying a central location coordinate and a radius, location coordinates at the vertices of a polygon, or other geometric constructs, defining an area of operation for one or more network stations as well as a plurality of mobile stations. A master drop box 203 may be established with a message board which typically will be accomplished at least one of the network stations. Access is then provided to the info at the drop box 205 while the system will wait for users 207 to access this information.

Thereafter, a plurality of requests may then be made by the user to access and/or post various requests regarding system functionality. For example, a user may request to become a remote drop box 209.

Figure 3:
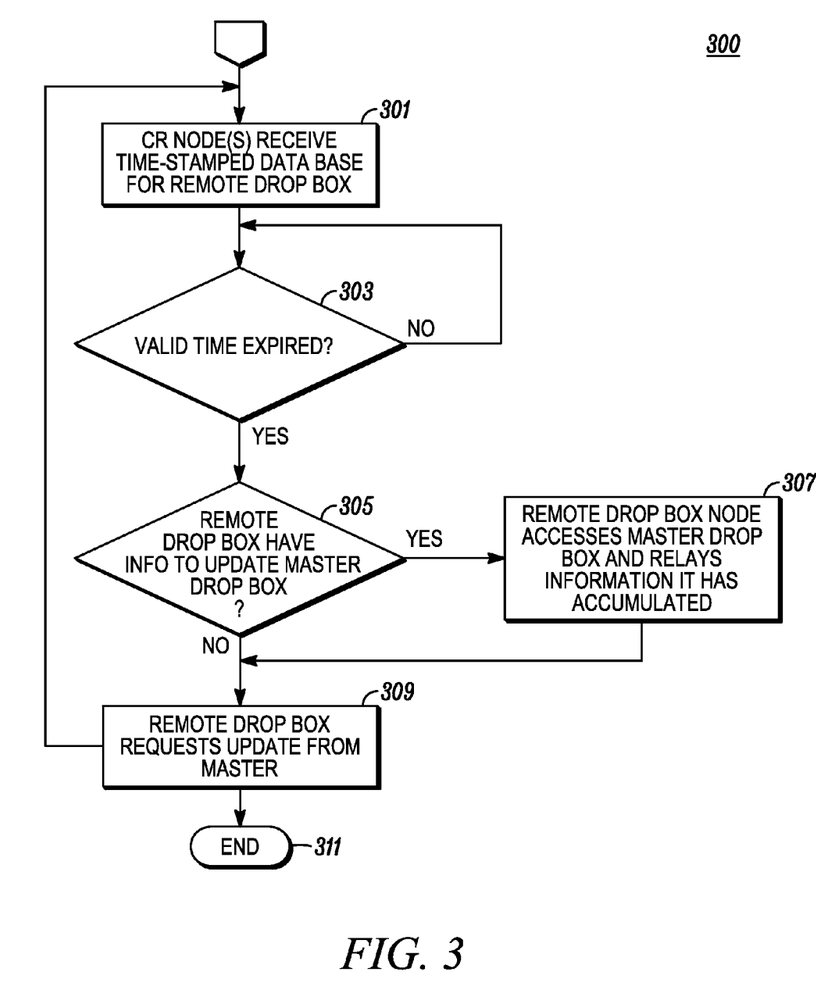
FIG. 3 is a flowchart diagram illustrating steps in a user request to become a remote drop box.

FIG. 3 is a flowchart diagram illustrating the steps in such a request to become a remote drop box. Initially, CR nodes receive a time stamped copy of the database for the remote drop box 301 and a determination is made 303 if the valid time stamp has expired. If the time stamp has not expired, this process is then repeated 303. However, upon expiration, a determination is made if the remote drop box has info to update the master drop box 305. If the master drop box is to be updated, the remote drop box node accesses the master drop box and relays information it has accumulated 307. However, if the remote drop box has no master update information, or if the accumulated information has been relayed, then the remote drop box requests an update from the master 309. This process repeats until the user request to become a remote drop box has been accomplished.

Figure 4:
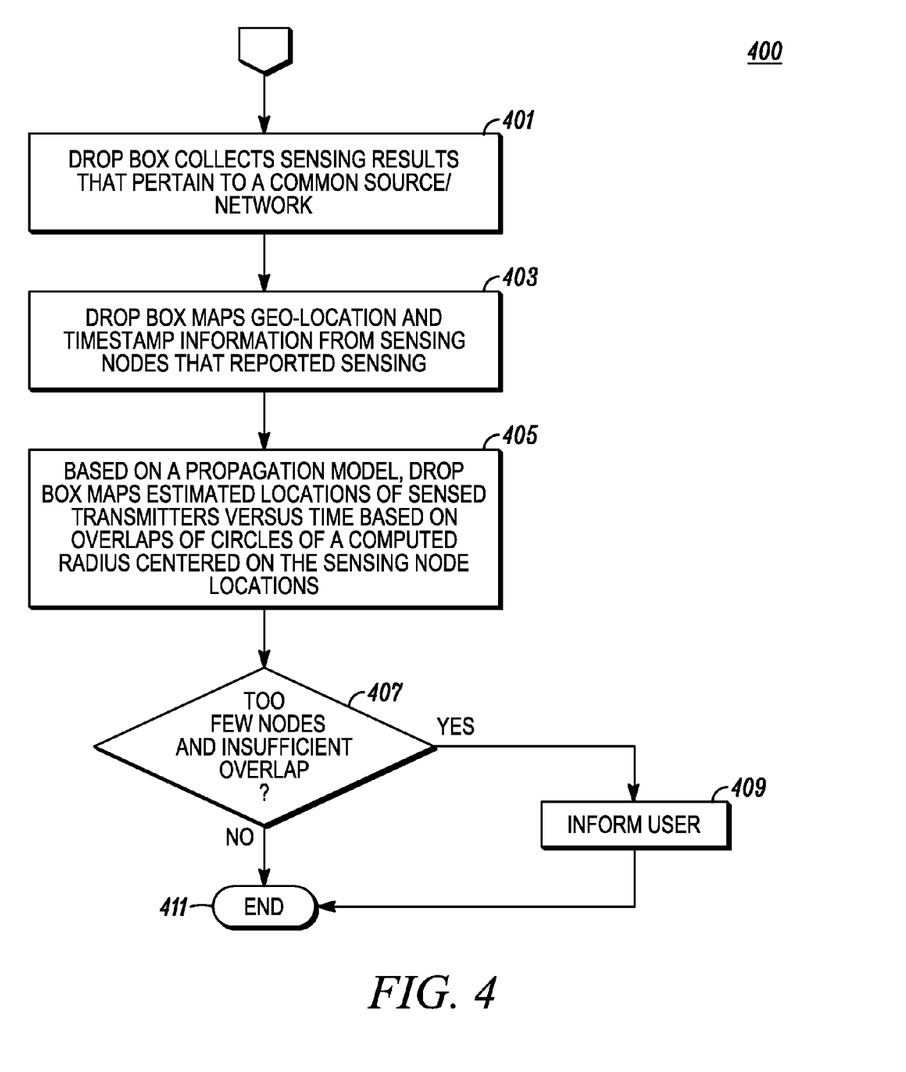
FIG. 4 is a flowchart diagram illustrating steps in a user request for pattern analysis.

The user may also request a pattern analysis of sensing data 211. FIG. 4 is a flowchart diagram illustrating steps in the user request for a pattern analysis. These steps would include collecting sensing results of 401 at the drop box that pertain to a common source/network. The drop box then maps geolocation and time stamp information 403 from the sensing nodes that have reported sensing information. Based on a propagation model, the drop box then maps estimated locations of sensed transmitters versus time-based overlaps of circles representing a computed radius centered on the sensing node location 405. In cases where there are too few nodes and insufficient overlap, a message may be conveyed to the user that pattern analysis of the sensing data is not possible in view of insufficient information 409. After the estimated locations have been mapped, the process ends 411.

Figure 5:
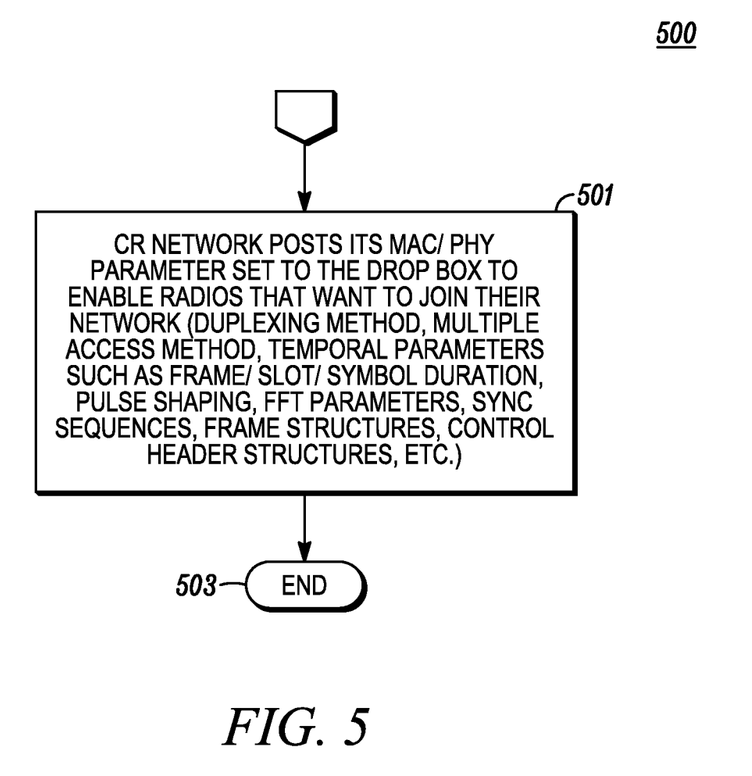
FIG. 5 is a flowchart diagram illustrating steps in a user request posting of MAC/PHY info.

A user may also request a posting of the media access control layer (MAC) or the physical layer protocol (PHY). FIG. 5 is a flowchart diagram illustrating the steps in a user-request posting of the MAC/PHY info. In view of this request, the CR network posts its MAC/PHY parameter set to the drop box 501. This works to enable radios that wish to join their network. As will be evident to those skilled in the art, these radios may utilize duplexing methods, multiple access methods, temporal parameters, such as frame/slot/symbol duration, pulse-shaping, Fast Fourier Transform (FFT) parameters, synch sequences, frame structures, control header sequences, and the like. After the MAC/PHY parameter set has been posted to the drop box, the process ends 503.

Figure 6:
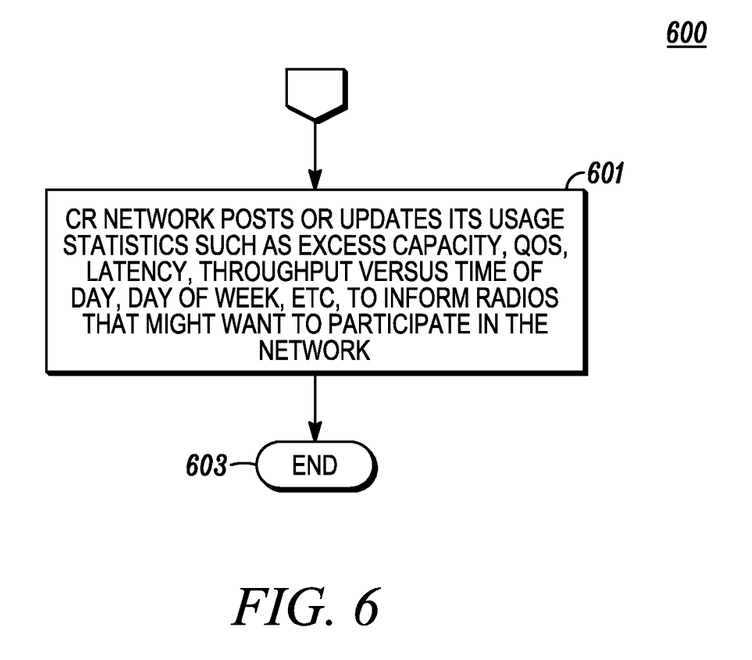
FIG. 6 is a flowchart diagram illustrating steps in a user request for posting its own usage statistics.

A user may also request a posting of its own usage statistics 215. FIG. 6 is a flowchart diagram illustrating steps in a user request to post its own usage statistics. This process begins when the CR network posts or updates its usage statistics, such as excess capacity, quality of service (QoS), latency, and throughput versus time of day, time of week, and other time-based parameters 601. This operates to inform the radios that might want to participate in the network on expected throughput and quality of the throughput they can expect if they choose to use the network. After this information is updated, this process ends 603.

Figure 7:
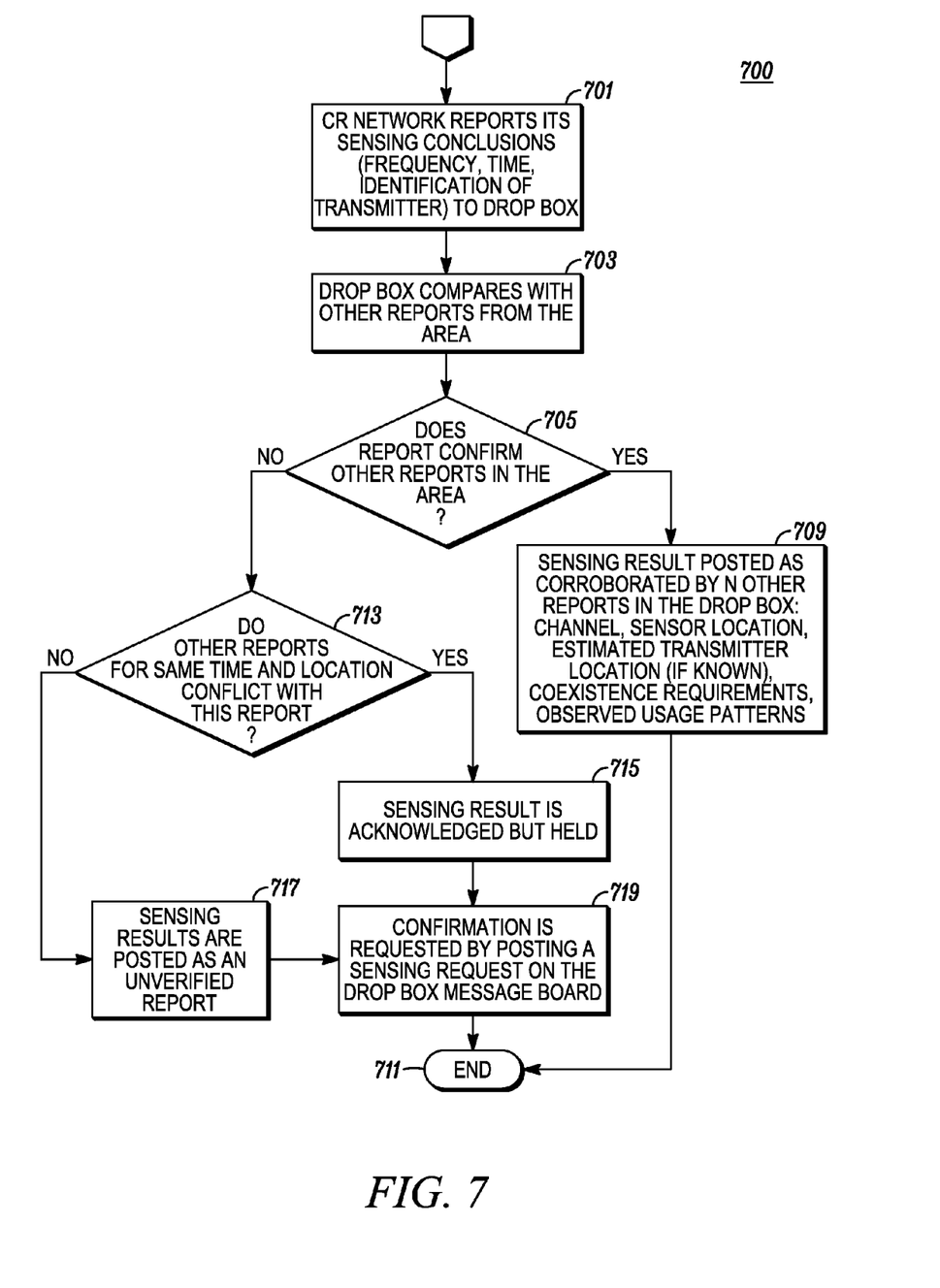
FIG. 7 is a flowchart diagram illustrating steps in a user request for permission to submit sensing conclusions.

The user may also request permission to submit its own sensing conclusions 217. FIG. 7 is a flowchart diagram illustrating the steps in a user request for permission to submit sensing conclusions. This process begins by the CR network reporting its sensing conclusions 701. These conclusions may refer to such parameters as frequency, time, and identification of a specific transmitter or transmitter type (e.g. licensed, unlicensed) to a drop box. Thereafter, the drop box compares these sensing conclusions with other reports from the area 703. A determination is then made if the report confirms other reports in the area 705. If other reports are confirmed, the sensing result is posted as corroborated by N other reports in the drop box 709. These corroborations may include such parameters as channel, sensor location, estimated transmitted location (if known), coexistence requirements, and/or observed usage patterns.

Thereafter, this process ends 711. However, if no report confirmation is made, a further determination is made if other reports for the same time and location conflict with the CR report 713. Those skilled in the art will recognize that in order for this determination to be made, this determination may be made on a majority or if some other sensor had better propagation conditions. If there is a conflict with this report, the sensing result is acknowledged, but is held without generating a report 715. Thereafter, a confirmation is requested by posting a sensing request on the drop box message board 719. The process ends thereafter 719. If no other reports for the same time and location conflict with the CR report, the sensing results are posted as an unverified report on the drop box message board 717. Confirmation can then be requested by posting a sensing request 719 where the process can then end 711.

Figure 8:
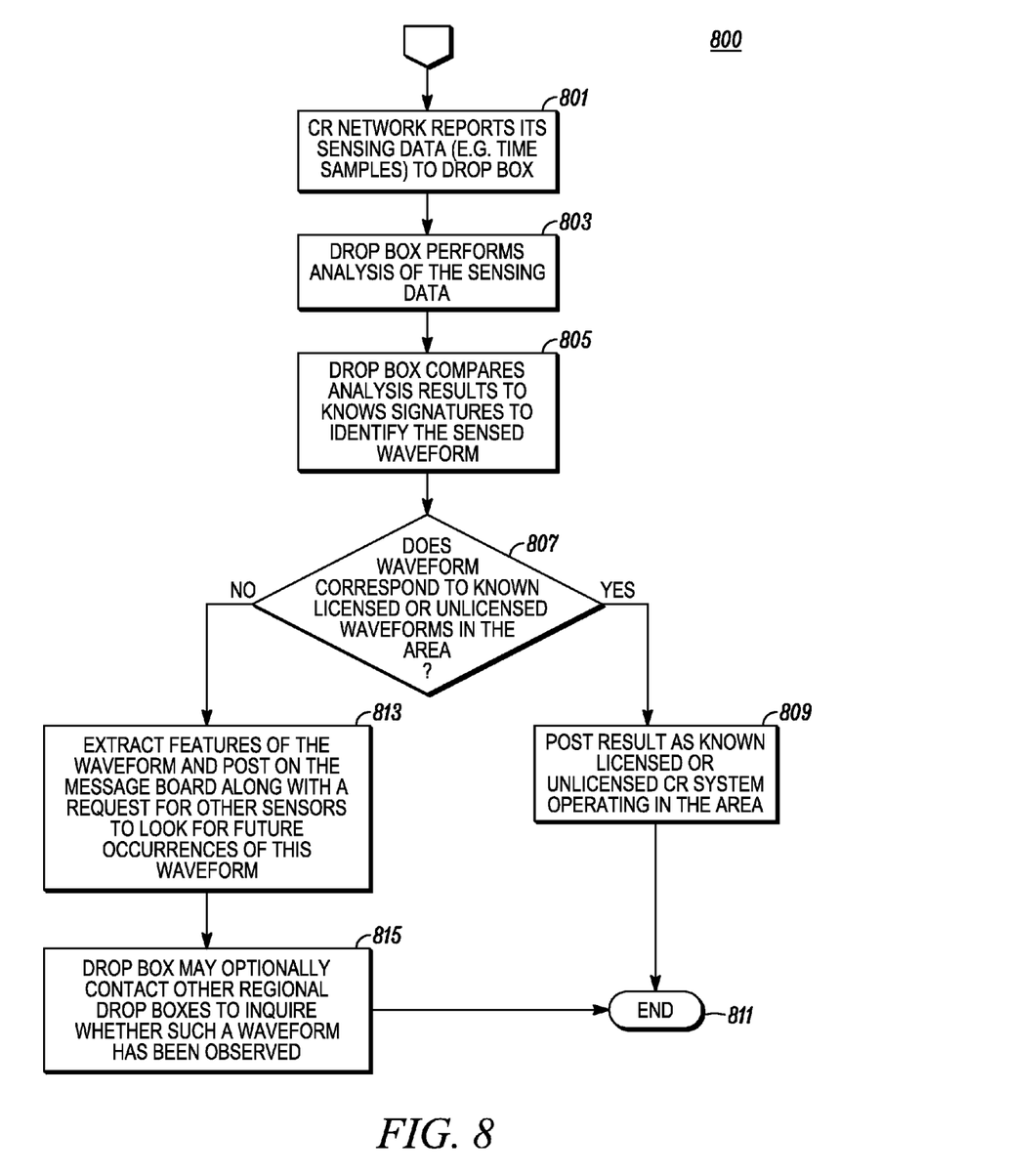
FIG. 8 is a flowchart diagram illustrating steps in a user request for permission to submit sensing data.

Finally, a user may also request permission to submit sensing data to a drop box 219. FIG. 8 is a flowchart diagram illustrating the steps in a user request for permission to submit sensing data 800. This process begins when the CR network reports its sensing data such as time samples to a drop box 801. The drop box performs an analysis of the sensing data 803 and compares these analysis results to known signatures for identifying a sensed wave form 805. A determination is then made if the wave form corresponds to the known licensed or unlicensed wave forms in an area 807. If a correspondence is made, the results are posted as a known licensed or unlicensed CR system operating in the area 809. Thereafter, the process ends 811. However, if the wave form does not correspond to a known licensed or unlicensed wave form, the features of the wave form are extracted 813 and posted on the drop box message board along with the request for other sensors to look for future occurrences of this wave form. The drop box may optionally contact other regional drop boxes to inquire whether such a wave form has been observed 815. Thereafter, the process ends 811.

Those skilled in the art will recognize that CR networks can benefit from shared sensing versus location and time observations. For example, a network, which may be cognitive, can report detection of television (TV) signals. If the detection of the TV signal indicates an isolated coverage area and certain temporal features, this may be an indication of an anomalous propagation mode, such as ducting or sporadic-E scattering. By sharing observations of multiple networks, a larger context of the environment can be generated and conclusions can be drawn regarding the origin of the signal.

In a similar way, localized use by higher priority local area networks can be described by a network, and other networks could determine whether they had to take action to satisfy interference constraints, such as decreasing transmitter power, altering an antenna pattern, or moving to another frequency. Those skilled in the art will further recognize that these previous networks may be cognitive but this is not required. Cooperation between participating CR networks can also include measurements of power from other network's transmissions, the time periods at which the transmissions take place, the protocol(s) used at these times, and other information, giving the CR network an indication of the extent of its emissions and operation and enabling it to more accurately adjust transmit power, transmit timing, and other factors to remedy potential interference situations. The database can also catalog spectral signatures that have been detected in the area with any information on the system, so that a CR network could contact the database with an inquiry such as "The following spectral signature was detected. Is there any information on this signature?"

In yet another aspect of the invention, participating networks catalog their MAC/PHY details (e.g., IEEE 802.xx, etc.). Knowledge of a neighboring network's air interface will help a CR system looking for opportunities to know whether its air interface will be a good match for sharing with that system. Not only should the MAC/PHY protocols be categorized, but also the traffic carried on these networks. For example, if all of the traffic on a particular network is low-priority, best effort data, then this network may be a good candidate for carrying high(er)-priority periodic voice traffic (given other characteristics of the network support such a service). Knowing what the protocol is as well as what is currently being transported will allow for more intelligent decisions on utilizing available channels. An intelligent implementation of the database could function as an agent to aid in identification of available spectrum or as a "marriage broker" to coordinate sharing between two systems. This could further involve pseudomonetary incentives to share such as systems using credit tokens.

Authenticity of such databases would be a concern. For example, a malicious participant might submit false measurement information on a channel to clear others away from it, leaving relatively pristine spectrum for the deceiver's use. Or, the malicious user's goal may simply be to disrupt the opportunity for others. As such, some authentication is desirable to ensure the veracity of the database. One method of defense would be to see if other networks can confirm the detection reported by a submission. This may not always be effective since the reported higher priority signal may be a short range signal, or the original report may be legitimate but the confirmation malicious, in this case falsifying the absence of the higher priority signal that is really present. Thus, the database would require a security component as well, such as some kind of membership code or some other means of authentication. One approach is to let falsifiers make their claims, but if the claims are later determined to be false, the MAC address of the sender could be barred from further access (either to contribute or to read).

Still another aspect of the invention is for nodes to report their actual sensing measurements or raw data rather than the conclusions they might otherwise have drawn from those measurements. This would allow for lower cost nodes that do not require software updates to identify new spectral signatures, and place the complexity in the central analysis node, which may be accessed directly via wireless connection from the sensors, or may be accessed via the internet or some other backbone, depending on the response times required by the spectrum incumbents. One concern is the amount of bandwidth required to report raw data from several/many nodes. Raw data is typically amounts to a great deal of information, as compared to processed data. There may need to be some mention of either (a) that the reports from each node are only sent when information changes by a certain amount, or at a given periodicity, or both, to keep it below some loading threshold, or (b) that some intermediate compression, between full raw data and fully processed results, is done in the inexpensive nodes. A third mechanism may be that they only report when polled, so that the centralized node has control over how much info gets reported. A good example in this case is if the centralized node already has recent reports from a certain geographic area, it won't poll for more info from nodes in that area, but if there has not been a report from a different geographic area for a long time period, then the centralized node can poll and/or solicit "raw" data from that area.

Finally, another aspect of the invention is to have a second receiver present in each node performing scanning and identification of unused channels followed by a return to the licensed user's channels to monitor their activity. Information gathered by the nodes would use a secure channel for configuration and control of the network behaviors. This secure and/or encrypted channel could be used for reporting the information back to the centralized server which maintains the sensing database, and/or could be used to send information to other radio nodes in the ad hoc network case and distributed database case.

Hence, the present invention is directed to a system and method for allowing heterogeneous CR networks to submit information regarding sensing observations as well as other information that could benefit heterogeneous networks by having a common repository for information from multiple regional area systems. Since all participating networks can benefit from the larger contextual picture of the environment, the invention provides a means to coordinate operations in an efficient manner to most efficiently utilize the frequency spectrum while protecting higher priority users.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A communications system for exchanging spectrum usage information comprising:
   a plurality of stations;
   at least one central station that defines a region of operation;
   a central drop box associated with the at least one central station for providing a database of spectrum usage information representing spectral occupancy of multiple channels, frequencies, and network; and
   a remote drop box, wherein at least one station of the plurality of stations become remote drop box in response to submitting a request to the at least one central station to become a remote drop box;
   wherein the plurality of stations submits spectrum usage information representing spectral occupancy of multiple channels, frequencies, and network to at least the central drop box or the remote drop box and further wherein the stations other than remote drop boxes use the at least one central station to submit a request for submitting the spectrum usage information representing spectral occupancy of multiple channels, frequencies, and network to the remote drop box.

2. A communications system as in claim 1, wherein the central drop box includes a message board for posting requests.

3. A communications system as in claim 1, wherein stations using the at least one central station submit a request for pattern analysis of sensed data, the sensed data being posted to the remote drop box.

4. A communications system as in claim 1, wherein stations using the at least one central station submit a request for posting of MAC/PHY information, the MAC/PHY information being posted to the remote drop box.

5. A communications system as in claim 1, wherein stations using the at least one central station submit a request for posting its own usage statistical information to the remote drop box.

6. A communications system as in claim 1, wherein stations using the at least one central station submit a request to submit sensing conclusions, the remote drop box corroborating the sensing conclusions.

7. A cognitive radio (CR) network for exchanging spectrum usage information through a data base comprising:
   at least one central station that defines a region of operation;
   a central drop box associated with the at least one central station for providing the database of spectrum usage information representing spectral occupancy of multiple channels, frequencies, and network and a bulletin board for posting message information; and
   wherein stations using the CR network utilize spectrum usage information representing spectral occupancy of multiple channels, frequencies, and network in the database for most effectively using frequency spectrum in the region of operation;
   further wherein the stations become remote drop boxes in response to submitting a request to the at least one central station to become a remote drop box, wherein stations other than remote drop boxes use the at least one central station to submit a request for submitting the spectrum usage information representing spectral occupancy of multiple channels, frequencies, and network to the remote drop box.

8. A CR network as in claim 7, wherein stations using the at least one central station submit a request for pattern analysis of sensed data, the pattern analysis being performed at the remote drop box.

9. A CR network as in claim 7, wherein stations using the at least one central station submit a request for posting of MAC/PHY information, the MAC/PHY information being posted at the remote drop box.

10. A CR network as in claim 7, wherein stations using the at least one central station submit a request for posting its own usage statistical information, the statistical information being posted at the remote drop box.

11. A CR network as in claim 7, wherein stations using the at least one central station submit a request for permission to submit sensing conclusions, the sensing conclusions being posted to the remote drop box.

12. A CR network as in claim 7, wherein stations using the at least one central station submit a request for permission to submit sensing data, the sensed data being posted to the remote drop box.

13. A method for exchanging spectrum usage information through a central drop box in a communications system using the central drop box comprising:
    defining a region of operation for at least one central station;
    associating the central drop box with the at least one central station for providing a database of spectrum usage information representing spectral occupancy of multiple channels, frequencies, and network;
    submitting spectrum usage information representing spectral occupancy of multiple channels, frequencies, and network by stations using the communications system regarding spectrum sensing observations of other stations to the central drop box that affects the region of operation;
    submitting a request by the stations to the at least one central station to become remote drop boxes and the stations becoming remote drop boxes in response to the submitted request, wherein stations other than remote drop boxes use the at least one central station to submit a request for the submitting spectrum usage information representing spectral occupancy of multiple channels, frequencies, and network to the remote drop box.

14. A method for exchanging spectrum sensing measurement data as in claim 13, further including the step of:
    submitting a request by a station using the at least one central station for pattern analysis of sensed data, the sensed data being posted to the remote drop box and the pattern analysis being performed at the remote drop box.

15. A method for exchanging spectrum sensing measurement data as in claim 13, further including the step of:
    submitting a request by a station using the at least one central station to post its own usage statistical information at the remote drop box.

16. A method for exchanging spectrum sensing measurement data as in claim 13, further including the step of:
    submitting a request by a station using the at least one central station to post its MAC/PHY information at the remote drop box.

17. A method for exchanging spectrum sensing measurement data as in claim 13, further including the step of:
    submitting a request by a station using the at least one central station to submit sensing conclusions at the remote drop box.

18. The method of claim 13, further including the step of:
    authenticating the stations submitting information to ensure the veracity of the database.

19. The method of claim 18, wherein the step of authenticating includes:
    receiving confirmation, by other networks, of the submitted information.

20. The method of claim 13, further including the step of:
    barring a station's MAC address when a false request is submitted.

21. A communications system for exchanging spectrum usage information comprising:
    a first drop box centralized at least one central station, the at least one central station defining a region of operation;
    a remote station that becomes a second drop box in response to submitting a request to the at least one central station to become a drop box; and
    stations that submit spectrum usage information to the drop box using the communications system; wherein the drop box provides a database of spectrum usage information which enables radios seeking to join the communication system to join with efficient and non-interfering use of the frequency spectrum wherein the drop box is a first drop box or a second drop box.

22. A communications system as in claim 21, wherein stations using the at least one central station submit a request for pattern analysis of sensed data, the sensed data being posted to the drop box.

23. A communications system as in claim 21, wherein stations using the at least one central station submit a request for posting its own usage statistical information to the drop box.

24. A communications system as in claim 21, wherein stations using the at least one central station submit a request to submit sensing conclusions, the drop box corroborating the sensing conclusions.

25. A communications system as in claim 21, wherein stations using the at least one central station submit a request for permission to submit sensing data, the sensed data being posted to the drop box.

\* \* \* \* \*